Dec. 11, 1928.
E. J. LAUGAUDIN
1,694,859
FLUID TIGHT PISTON
Filed Dec. 23, 1927
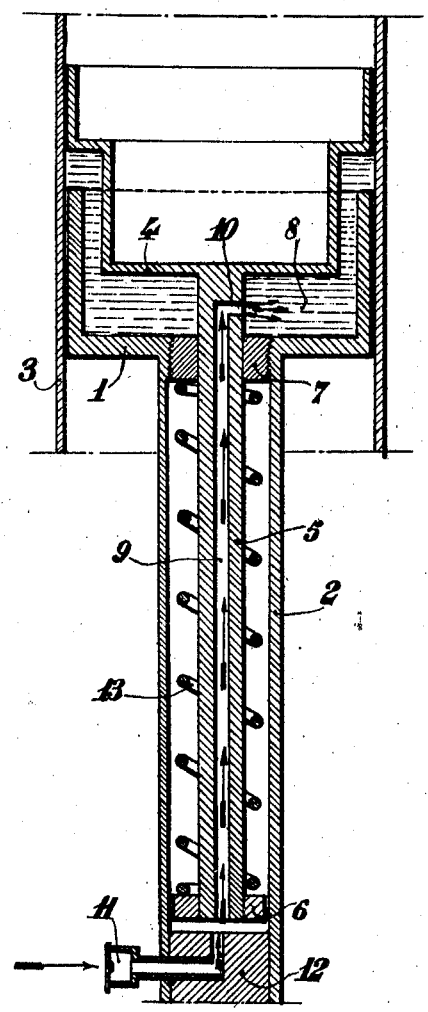
E. J. Laugaudin
INVENTOR
BY: Marks & Clerk
Attys Patented Dec. 11, 1928.

1,694,859

UNITED STATES PATENT OFFICE.

EUGÈNE JULES LAUGAUDIN, OF PARIS, FRANCE.

FLUID-TIGHT PISTON.

Application filed December 23, 1927, Serial No. 242,190, and in France December 23, 1926.

The present invention relates to a piston so combined as to present an absolute fluid-tightness and to prevent the passage of any fluid between the periphery of the said piston and the walls of the cylinder within which it is movable.

This piston is essentially constituted by two associated pistons, resiliently connected together, and between which is interposed a fluid body, preferably a fatty body.

The said piston is illustrated by way of example in the accompanying drawing which is a sectional view of the same.

This piston is composed of a first piston, the head 1 of which is hollow and mounted at the end of a tube 2 constituting the end of the rod proper of the piston.

A second piston 4 is arranged in front of the first piston in the cylinder 3; it is composed of a head 4 having preferably a shape suitable for fitting into the head of the piston 1; the said head 4 is mounted at the end of a rod 5 fitting into the hollow rod 2 of the piston 1.

This rod 5 is exactly held in the axis of the tube 2 by means of two washers, one of which, 6, is secured on the rod 5, preferably at its end and having approximately the same diameter as the inner diameter of the tube 2; the other washer 7, is secured to the said tube 2, preferably adjacent to the head 1; the inner diameter of this washer is approximately the same as the external diameter of the rod 5.

In order to constitute a perfectly fluid-tight piston between the two heads of the pistons 1 and 4, in the space 8, is interposed any fluid body, preferably a fatty body.

For allowing this fluid to be sent in the space 8, the rod 5 is axially perforated so as to form a conduit 9 opening at 10 in the space 8; the fluid will be sent in the said conduit by means of a pressure lubricating device of any type by the lubricator 11 mounted on the extension 12 of the piston rod 2.

In order to ensure the space 8 being always filled up, a coil spring 13, taking a bearing at both ends on the washers 6 and 7 tends to bring back against each other the two pistons 1 and 4.

It will be understood that greater the quantity of fluid injected in the space 8, the more the two pistons are spaced apart by compressing the spring 13; if losses of fluid take place, the spring will expand, bringing back the two pistons against each other and diminishing the volume of the space 8 which consequently, will always be full of fluid on which is exerted the pressure of the spring, resulting in the production of a joint absolutely impervious to gases acting on the other face of the whole of the piston.

The washers 6 and 7 obturate the space comprised between the tube 2 and the rod 5, lent if a certain quantity of fluid should enter the said space, this would be without any inconvenience, even if this space should be filled up.

In the drawing, the pistons 1 and 4 have been illustrated under a special shape telescoping each other; this arrangement is given by way of example only; it presents the advantage of having a relatively important stock of fluid material between the two pistons.

This system of pistons presents therefore a perfect fluid-tightness and its applications are numerous.

It has been indicated that the fluid body confined between the two pistons would preferably be a fatty body, but this is only a simple indication, as the fluid body can be of any kind and chosen according to the work required form the piston and the industrial application for which it is intended.

The spring 13, in the example illustrated, operates by compression, it might operate by tension without altering its working conditions.

Moreover, the forms, details of construction, dimensions and materials used may be varied without departing thereby from the principle of the invention.

Claim:

A fluid-tight piston constituted by two associated pistons resiliently connected together, the space comprised by the two piston heads being filled with a fluid body ensuring the fluid-tightness of the whole of the piston, the said space being maintained constantly filled up with the fluid body by means of a device tending to bring back both pistons against each other, this device being preferably constituted by a spring acting on the rods of both pistons, one of the said rods being hollow and the other being fitted in the first one, the fluid body being injected by means of a pressure lubricating device.

In testimony whereof I have signed my name to this application.

EUGÈNE JULES LAUGAUDIN.